United States Patent
Papenbroock et al.

(10) Patent No.: US 10,196,549 B2
(45) Date of Patent: *Feb. 5, 2019

(54) MULTI-PHASE POLYMER COMPOSITION

(71) Applicant: TESA SE, Norderstedt (DE)

(72) Inventors: Marten Papenbroock, Hamburg (DE); Alexander Prenzel, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/100,799

(22) PCT Filed: Oct. 30, 2014

(86) PCT No.: PCT/EP2014/073307
§ 371 (c)(1),
(2) Date: Jun. 1, 2016

(87) PCT Pub. No.: WO2015/082143
PCT Pub. Date: Jun. 11, 2015

(65) Prior Publication Data
US 2016/0304754 A1 Oct. 20, 2016

(30) Foreign Application Priority Data
Dec. 3, 2013 (DE) .......... 10 2013 224 773

(51) Int. Cl.
C08L 51/00 (2006.01)
C09J 151/00 (2006.01)
C08F 290/04 (2006.01)
B32B 37/12 (2006.01)

(52) U.S. Cl.
CPC .......... C09J 151/003 (2013.01); B32B 37/12 (2013.01); C08F 290/048 (2013.01); C08L 51/003 (2013.01); B32B 2309/02 (2013.01)

(58) Field of Classification Search
CPC ...... C09J 151/06; C09J 191/00; C08F 255/10; C08F 220/18; C08L 2205/02; C08L 2207/02

See application file for complete search history.

(56) References Cited

U.S. PATENT DOCUMENTS

| | | | |
|---|---|---|---|
| 5,625,005 A | 4/1997 | Mallya et al. | |
| 6,197,845 B1 * | 3/2001 | Janssen | C09J 7/043 156/291 |
| 6,642,298 B2 | 11/2003 | Foreman et al. | |
| 6,670,417 B2 | 12/2003 | Foreman et al. | |
| 2003/0022980 A1 | 1/2003 | Foreman et al. | |
| 2003/0166767 A1 * | 9/2003 | Foreman | C08F 290/042 524/504 |
| 2010/0266837 A1 | 10/2010 | Srivatsan et al. | |
| 2013/0274435 A1 | 10/2013 | Diekmann et al. | |
| 2014/0315016 A1 | 10/2014 | Dollase et al. | |
| 2014/0342282 A1 | 11/2014 | Tada et al. | |

FOREIGN PATENT DOCUMENTS

| | | |
|---|---|---|
| CN | 1622987 A | 6/2005 |
| CN | 102395641 A | 3/2012 |
| DE | 694 24 423 T2 | 1/2001 |
| DE | 102 97 685 T5 | 3/2005 |
| EP | 1 211 269 A1 | 6/2002 |
| EP | 2 479 231 A1 | 7/2012 |
| JP | H09-502467 A | 3/1997 |
| JP | 2001-279199 A | 10/2001 |
| JP | 2003-013027 A | 1/2003 |
| JP | 2005-521774 A | 7/2005 |
| JP | 2013-077003 A | 4/2013 |
| JP | 2013-108015 A | 6/2013 |
| JP | 2013-185113 A | 9/2013 |
| JP | 2013-216890 A | 10/2013 |
| JP | 2014-435309 A | 12/2014 |
| TW | 593614 B | 6/2004 |

OTHER PUBLICATIONS

International Search Report dated Jan. 26, 2015, dated Feb. 2, 2015.
English Translation of International Search Report dated Jan. 26, 2015, dated Feb. 2, 2015.
English Translation of Chinese Office Action dated Feb. 21, 2017 for corresponding Chinese Application No. 201480073312.3.
English translation of Taiwanese Office Action corresponds to Taiwanese Application No. 10314139 dated Jun. 6, 2018.
English translation of Japanese Office Action corresponds to Japanese Application No. 2016-536132 dated Jun. 13, 2018.

* cited by examiner

*Primary Examiner* — Jeffrey C Mullis

(74) *Attorney, Agent, or Firm* — Norris McLaughlin, P.A.

(57) ABSTRACT

Multi-phase polymer composition comprising a comb polymer (A) which forms a continuous acrylate phase and a discontinuous hydrocarbon phase, and at least one hydrocarbon compound (B) which is soluble in the hydrocarbon phase of the comb polymer (A), an adhesive mass comprising the multi-phase polymer composition.

16 Claims, No Drawings

MULTI-PHASE POLYMER COMPOSITION

This is a 371 of PCT/EP2014/073307 filed 30 Oct. 2014, which claims foreign priority benefit under 35 U.S.C. 119 of German Patent Application 10 2013 224 773.7 filed Dec. 3, 2013.

TECHNICAL FIELD OF THE INVENTION

The present invention relates to a multiphase polymer composition comprising a comb-type graft copolymer (A), which forms a continuous acrylate phase and a discontinuous hydrocarbon phase, and also at least one hydrocarbon compound (B), which is soluble in the hydrocarbon phase of said comb-type graft polymer (A), and also, optionally, further additives. The present invention further relates to pressure-sensitive adhesives comprising the multiphase polymer composition of the present invention and also to the method of using this pressure-sensitive adhesive for bonding articles, in particular for bonding articles having apolar surfaces. A method of preparing the multiphase polymer composition is likewise described.

GENERAL PRIOR ART

Pressure-sensitively adhesive polymer compositions based on acrylates are known from the prior art. Acrylate-based adhesives are by virtue of their chemical resistance particularly suitable for bonding in industrial applications, and the polymer compositions described in the prior art are used to bond various substrates. However, known compositions are disadvantageous in that they are difficult to use with substrates having surfaces of low energy (i.e., "low surface energy" materials, hereinafter also referred to as "LSE" materials). This is reflected not only in the (low) bond strength of known pressure-sensitive adhesives on apolar substrates such as polypropylene or steel coated with LSE paint but also in the (low) speed at which the maximum bond strengths are attained. The main factor responsible for the low bond strengths of known acrylate-based pressure-sensitive adhesives on apolar surfaces is considered to be the difference in the surface energies of the known polymer compositions and of the LSE materials and also the absence of suitable points of attachment within the LSE surfaces for covalent or strong non-covalent bonds. Adhesion between known acrylate-based polymer compositions and LSE surfaces therefore essentially occurs through weaker van der Waals forces.

One approach to obtaining higher bond strengths between LSE surfaces and polymer compositions based on polyacrylates consists in the use of tackifying resins. Another approach utilizes so-called primers, i.e., adhesion promoters, to raise the surface energy of LSE substrates. While the deployment of primers is costly and inconvenient, the use of tackifying resins leads to a reduction in the cohesive strength of the polymer composition, which may cause the bond to break under load.

US 2010/0266837 A1 against this background discloses pressure-sensitive adhesives comprising a comb-type graft copolymer and a hydrocarbon compound having a molecular weight of at least 1000 g/mol. The results of these prior art pressure-sensitive adhesives still leave something to be desired, however, and there is a fundamental need for pressure-sensitive adhesives having good bond strengths on apolar surfaces without having to make compromises in respect of cohesive strength. Pressure-sensitive adhesives of this type should further evince chemical resistance and develop high bond strengths after just a short time.

OBJECT OF THE PRESENT INVENTION

The present invention accordingly has for its object to provide an improved polymer composition.

SUMMARY OF THE PRESENT INVENTION

The present invention addresses this object and the problems of the prior art by providing a multiphase polymer composition comprising
- a comb-type graft copolymer (A) which is obtainable by polymerizing at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw,
- and at least one hydrocarbon compound (B) soluble in said hydrocarbon phase Kw of said comb-type graft copolymer (A), wherein the multiphase polymer composition comprises a continuous acrylate phase having a static glass transition temperature Tg(Ac), as measured by the DSC method (measurement method A-2), and a discontinuous hydrocarbon phase Kw1 having a static glass transition temperature Tg(Kw1), as measured by the DSC method (measurement method A-2), and wherein the said static glass transition temperatures Tg(Kw1) and Tg(Ac) of the polymer composition differ by 35 to 60 kelvins, preferably by 40 to 60 kelvins, more preferably by 45 to 60 kelvins.

The static glass transition temperature of the discontinuous hydrocarbon phase Kw1 within the polymer composition, Tg(Kw1), is preferably in a range from −5 to +15° C., more preferably from 0 to +10° C. The static glass transition temperature of the continuous acrylate phase within the polymer composition, Tg(Ac), is preferably below −10° C., more preferably in a range from −60 to −20° C., yet more preferably in a range from −50 to −30° C.

The present invention further provides methods of preparing the multiphase polymer composition, said methods comprising the steps of
- polymerizing at least one (meth)acrylate monomer in the presence of at least one macromer selected from the group consisting of polymerizable ethylene-butylene, ethylene-propylene, ethylene-butylene-propylene and isobutylene macromers to form a comb-type graft copolymer (A) having an acrylate main chain and hydrocarbon side chains;
- mixing said comb-type graft copolymer (A) thus obtained with at least one hydrocarbon compound (B) which is compatible with the hydrocarbon side chains of said comb-type graft copolymer (A);
- and also, optionally, the step of crosslinking reactive functional groups.

Comb-type graft copolymer (A) as described herein forms a continuous acrylate phase and a discontinuous hydrocarbon phase Kw as soon as a multiplicity of polymer chains of individual comb-type graft copolymer molecules come into contact with one another, for example after a solvent has been removed. Association occurs of the acrylate main chains and the hydrocarbon side chains so as to form a continuous acrylate phase and a discontinuous hydrocarbon phase.

The multiphase polymer compositions of the present invention comprise at least two phases, namely at least a hydrocarbon phase Kw1 and an acrylate phase. Evidence for the presence of these phases is derivable from determining the static glass transition temperatures of the polymer composition by means of DSC. Alternatively or additionally, the presence of the different phases can be evidenced by means of dynamic mechanical analysis (DMA) (measurement method A3). A so-called temperature sweep measurement here will detect two or more glass transitions resulting from the individual constituents of the composition.

The continuous acrylate phase of the polymer composition has a static glass transition temperature Tg(Ac), as measured by the DSC method (measurement method A-2), and the discontinuous hydrocarbon phase Kw1 as a static glass transition temperature Tg(Kw1), as measured by the DSC method (measurement method A-2). The static glass transition temperatures Tg(Kw1) and Tg(Ac) of the polymer composition differ by 35 to 60 kelvins, preferably by 40 to 60 kelvins, more preferably by 45 to 60 kelvins.

Owing to the particular combination of the comb-type graft copolymer (A) and the hydrocarbon compound (B), which is soluble in the hydrocarbon phase of the comb-type graft copolymer (A), the composition is stable despite the different phases, in that it does not undergo and macroscopic type of phase separation into the comb-type graft copolymer (A) on the one hand and the at least one hydrocarbon compound (B) on the other.

The multiphase polymer compositions of the present invention will prove particularly useful in the bonding of articles having LSE surfaces. They are further chemically and UV resistant and are highly cohesive not only at room temperature (25° C.) but also at high temperatures, which shows in high levels of shear strength. Surprisingly, the polymer compositions nonetheless wet out rapidly on surfaces of low-energy articles, on surfaces coated with LSE varnishes and also on other LSE materials, which makes possible the development of high levels of bond strength within a short time. The multiphase polymer compositions of the present invention are further useful in providing pressure-sensitive adhesives that are transparent. In a further aspect, the present invention accordingly provides pressure-sensitive adhesives, preferably transparent pressure-sensitive adhesives, comprising the multiphase polymer composition described herein. The present invention further provides the method of using the pressure-sensitive adhesive to bond articles, in particular to bond articles having low surface energies (LSE materials). LSE materials for the purposes of the present invention also comprehend materials which are actually not LSE materials, but whose surfaces behave like LSE materials with respect to adhesives by reason of a coating, e.g., with a layer of an LSE varnish.

DETAILED DESCRIPTION OF THE INVENTION

The object described above is achieved according to the invention by a multiphase polymer composition comprising
 a comb-type graft copolymer (A) which is obtainable by polymerizing at least one (meth)acrylate monomer in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw,
 and at least one hydrocarbon compound (B) soluble in said hydrocarbon phase Kw of said comb-type graft copolymer (A),
 wherein the multiphase polymer composition comprises a continuous acrylate phase having a static glass transition temperature Tg(Ac), as measured by the DSC method, and a discontinuous hydrocarbon phase Kw1 having a static glass transition temperature Tg(Kw1), as measured by the DSC method, and wherein the said static glass transition temperatures Tg(Kw1) and Tg(Ac) of the polymer composition differ by 35 to 60 kelvins, preferably by 40 to 60 kelvins, yet more preferably by 45 to 60 kelvins.

In one preferred embodiment, the polymer composition described herein is characterized in that the static glass transition temperature of the discontinuous hydrocarbon phase within the polymer composition, Tg(Kw1), is in a range from −5 to +15° C., preferably 0 to +10° C. Likewise preferably, the static glass transition temperature of the continuous acrylate phase within the polymer composition, Tg(Ac), is below −10° C., preferably in a range from −60 to −20° C., more preferably in a range from −50 to −30° C.

Suitable polymer compositions are obtainable by first providing a comb-type graft copolymer (A) whose polymer backbone (also referred to hereinafter as "backbone", "polymer main chain" or "main chain") consists to an extent of at least 20 weight percent, based on the total weight of the polymer backbone, preferably at least 50 weight percent, more preferably at least 80 to 100 weight percent, of acrylate monomer units. For this purpose, in accordance with the invention, the at least one (meth)acrylate monomer is polymerized in the presence of the at least one macromer selected from the group consisting of polymerizable ethylene-butylene, ethylene-propylene, ethylene-butylene-propylene and isobutylene macromers.

The at least one (meth)acrylate monomer may be a monomer mixture of two or more (meth)acrylate monomers, and preferably comprises at least one monomer selected from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate, decyl acrylate, hydroxyethyl acrylate, hydroxyethyl methacrylate and 4-hydroxybutyl acrylate, preferably from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate and decyl acrylate.

In one preferred embodiment of the invention, the polymerization of the at least one (meth)acrylate monomer or of the monomer mixture of two or more (meth)acrylate monomers ("monomer mixture" hereinbelow) takes place in the presence of at least one further copolymerizable monomer. This further copolymerizable monomer is preferably selected from the group consisting of itaconic acid, itaconic anhydride, maleic acid, maleic anhydride, vinyl acetate, vinyl butyrate, vinyl propionate, vinyl isobutyrate, vinyl valerate, vinyl versatates, N-vinylpyrrolidone and N-vinylcaprolactam.

Likewise preferably, the polymerization of the at least one (meth)acrylate monomer or of the monomer mixture is carried out in the presence of a further, second macromer. This additional, second macromer is a non-polyolefinic macromer, preferably selected from polymethacrylates, polystyrenes, polydimethylsiloxanes, polyethylene oxides and polypropylene oxides.

The polymer composition of the invention comprises, in addition to the comb-type graft copolymer (A), at least one hydrocarbon component (B) which is soluble in the hydrocarbon phase Kw of the comb-type graft copolymer. In precisely the same way as the at least one (meth)acrylate monomer may be a mixture of two or more (meth)acrylate monomers, the at least one hydrocarbon compound (B) may also be a mixture of various hydrocarbon compounds, preferably a mixture of two hydrocarbon compounds (B-1) and (B-2). The hydrocarbon compounds (B), (B-1) and (B-2) are preferably hydrocarbon resins having a number average molecular weight Mn of 1000 g/mol or less, as measured by the GPC method. In one particularly preferred embodiment, the hydrocarbon compound (B) comprises a hard resin (B-1) and/or a soft resin (B-2), preferably not only a hard resin (B-1) but also a soft resin (B-2).

In a further embodiment of the invention, the polymer composition (P) further comprises a hydrocarbon compound (C) whose number-average molecular weight (Mn), measured by the GPC method, is more than 1000 g/mol. In a further embodiment, the polymer composition comprises at least one additive selected from the group consisting of plasticizers, oils and resins which are soluble in the acrylate phase of the comb-type graft copolymer (A), preferably rosin esters and/or terpene-phenolic resins.

In a second aspect, the present invention provides methods of preparing a multiphase polymer composition as claimed in any preceding claim, which methods comprise the steps of
polymerizing at least one (meth)acrylate monomer in the presence of at least one macromer selected from the group consisting of polymerizable ethylene-butylene, ethylene-propylene, ethylene-butylene-propylene and isobutylene macromers to form a comb-type graft copolymer (A) having an acrylate main chain and hydrocarbon side chains;
mixing said comb-type graft copolymer (A) thus obtained with at least one hydrocarbon compound (B) which is compatible with the hydrocarbon side chains of said comb-type graft copolymer (A);
and also, optionally, the step of crosslinking reactive functional groups.

The present invention further provides pressure-sensitive adhesives comprising a multiphase polymer composition as described herein and also the method of using said pressure-sensitive adhesive to bond articles, in particular articles having surfaces with a low surface energy (LSE materials).

In what follows, the components of the polymer composition according to the present invention and of the pressure-sensitive adhesive comprising said polymer composition are more particularly described.

Comb-Type Graft Copolymer (A)

Comb-type graft copolymers are polymers with a construction characteristic in that on their main chain (polymer backbone) they carry side chains which by virtue of their length might already be considered to be polymeric.

As used herein, the comb-type graft copolymer (A) is intended to stand for a copolymer which more particularly is obtainable by free radical polymerization of at least one (meth)acrylate monomer or of a monomer mixture in the presence of at least one macromer selected from the group consisting of polymerizable ethylene-butylene, ethylene-propylene, ethylene-butylene-propylene and isobutylene macromers.

(Meth)Acrylate Monomer

The comb-type graft copolymer (A) of the polymer composition according to the invention is obtainable by polymerizing the at least one (meth)acrylate monomer or a monomer mixture of two or more, for example three, (meth) acrylate monomers in the presence of the at least one macromer. Further copolymerizable monomers may also take part in the polymerization. The at least one (meth) acrylate monomer or the monomer mixture comprising the at least one (meth)acrylate monomer makes up preferably 50-99, more preferably 75-95, very preferably 85-90 weight percent of all constituents participating in the polymerization, i.e. all copolymerizable monomers, macromers, including the at least one (meth)acrylate monomer. The macromer is present preferably in a fraction of 1-50, more preferably 5-25, very preferably 10-15 weight percent, based on all constituents participating in the polymerization i.e. based on all copolymerizable monomers and macromers, including the at least one (meth)acrylate monomer.

The at least one (meth)acrylate monomer may be a monomer mixture of two or more (meth)acrylate monomers, and preferably comprises at least one more preferably two, in particular three monomers selected from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate, decyl acrylate, hydroxyethyl acrylate, hydroxyethyl methacrylate and 4-hydroxybutyl acrylate, preferably from the group consisting of acrylic acid, methacrylic acid, 2-ethylhexyl acrylate, methyl acrylate, butyl acrylate, isobornyl acrylate, stearyl acrylate, isostearyl acrylate, amyl acrylate, isooctyl acrylate and decyl acrylate.

In one preferred embodiment of the invention, the polymerization of the at least one (meth)acrylate monomer or of the monomer mixture of two or more (meth)acrylate monomers ("monomer mixture" hereinbelow) takes place in the presence of at least one further copolymerizable monomer. This further copolymerizable monomer is preferably selected from the group consisting of itaconic acid, itaconic anhydride, maleic acid, maleic anhydride, vinyl acetate, vinyl butyrate, vinyl propionate, vinyl isobutyrate, vinyl valerate, vinyl versatates, N-vinylpyrrolidone and N-vinylcaprolactam.

The at least one (meth)acrylate monomer which—as described herein—may be polymerized to form the comb-type graft copolymer (A) by polymerization in the presence of the at least one macromer is preferably selected such that the continuous acrylate phase of the multiphase polymer composition of the invention has a static glass transition temperature, Tg(Ac), of less than −10° C., preferably in a range from −60° C. to −20° C., more preferably in a range from −50 to −30° C. Employed preferably for this purpose is at least one, more preferably at least two, monomers known as low-Tg (meth)acrylate monomers, whose homopolymers have a static glass transition temperature (Tg), measured by the DSC method (measurement method A2), of 40° C. or less, preferably 25° C. or less. "Low-Tg" monomers of this kind are described in J. Brandrup, E. H. Immergut, E. A. Grulke, Polymer Handbook, 4th Edition, 1998. In one preferred embodiment, the at least one (meth)acrylate monomer comprises at least one (meth)acrylate monomer having a C1-C18 alkyl radical in the ester group, preferably butyl acrylate, amyl acrylate, 2-ethylhexyl acrylate, isooctyl acrylate and decyl acrylate.

The at least one (meth)acrylate monomer or, in the case of a mixture of two or more (meth)acrylate monomers, the monomer mixture comprising these (meth)acrylate monomers is therefore preferably a low-Tg monomer or a mixture of such monomers. This low-Tg monomer or mixture is present preferably in a fraction of 43-97 weight percent, based on all constituents participating in the polymerization. In this preferred embodiment, the polymerization of the at least one (meth)acrylate monomer takes place advantageously in the presence of acrylic acid, methacrylic acid, itaconic acid, itaconic anhydride, maleic acid, maleic anhydride and/or of a further, so-called high-Tg monomer, whose homopolymers have a static glass transition temperature (Tg), measured by the DSC method (measurement method A2), of more than 40° C., preferably more than 80° C. "High-Tg" monomers of this kind are described in J. Brandrup, E. H. Immergut, E. A. Grulke, Polymer Handbook, 4th Edition, 1998. Acrylic acid, methacrylic acid, itaconic acid, itaconic anhydride, maleic acid, maleic anhydride and/or the other high-Tg monomer or monomers are present preferably in a fraction of 2-7, more preferably in a fraction of 2-6, very preferably in a fraction of 3-5 weight percent, based on the total weight of all constituents participating in the polymerization, i.e. all monomers and macromers.

In one preferred embodiment of the invention, therefore, the comb-type graft copolymer (A) is obtainable by polymerization of at least one (meth)acrylate monomer or of a monomer mixture of two or more (meth)acrylate monomers, these (meth)acrylate monomers being low-Tg monomers, in the presence of 2-7 weight percent, based on the total weight of all constituents participating in the polymerization, of at least one monomer which is selected from the group consisting of acrylic acid, methacrylic acid, itaconic acid, itaconic anhydride, maleic acid and maleic anhydride.

In other words, participants in the polymerization leading to the comb-type graft copolymer (A), besides the at least one macromer, are preferably at least three monomers, of which one is selected from the group consisting of acrylic acid, methacrylic acid, itaconic acid, itaconic anhydride, maleic acid, maleic anhydride and further monomers whose homopolymers have a static glass transition temperature (Tg), measured by the DSC method, of more than 40° C., preferably more than 80° C. (also referred to herein as "high-Tg" monomer). As used herein, the expression "high-Tg" monomer is based on the static glass transition temperature of the homopolymers as described in J. Brandrup, E. H. Immergut, E. A. Grulke, Polymer Handbook, 4th Edition, 1998. Participating preferably in the polymerization that leads to the comb-type graft copolymer (A) (hereinafter also "polymerization"), therefore, is only one of these high-Tg comonomers, more preferably acrylic acid or methacrylic acid, preferably acrylic acid. In accordance with the invention, this high-Tg comonomer is used preferably in an amount of 2-7 weight percent, based on the total weight of all constituents participating in the polymerization, preferably in an amount of 2-6, more preferably in an amount of 3-5 weight percent.

In one embodiment the polymerization takes place in the presence of up to 20 weight percent, preferably up to 15 weight percent (based on the total weight of all constituents participating in the polymerization), of at least one further copolymerizable monomer, selected from the group consisting of isobornyl acrylate, stearyl acrylate, isostearyl acrylate, hydroxyethyl acrylate, hydroxyethyl methacrylate, 4-hydroxybutyl acrylate, vinyl acetate, vinyl butyrate, vinyl propionate, vinyl isobutyrate, vinyl valerate, vinyl versatate, N-vinylpyrrolidone and N-vinylcaprolactam, preferably selected from isobornyl acrylate, stearyl acrylate, isostearyl acrylate, vinyl acetate, vinyl butyrate, vinyl propionate, vinyl isobutyrate, vinyl valerate, vinyl versatate, N-vinylpyrrolidone and N-vinylcaprolactam.

In one particularly preferred embodiment, no hydroxyalkyl (meth)acrylate participates in the polymerization. It is thought that the polymerization of the at least one (meth)acrylate monomer in the absence of hydroxyalkyl (meth)acrylates allows the provision of particularly advantageous comb-type graft copolymers (A).

Employed with particular preference in the polymerization are mixtures comprising acrylic acid, butyl acrylate, 2-ethylhexyl acrylate and isobornyl acrylate, more preferably acrylic acid, butyl acrylate and 2-ethylhexyl acrylate.

Exemplary preferred mixtures consist of 3-7 weight percent acrylic acid, 45-65 weight percent butyl acrylate, 20-27 weight percent 2-ethylhexyl acrylate and up to 15 weight percent isobornyl acrylate, the figures in weight percent being based on the total weight of the comonomer mixture and of the at least one macromer, i.e. on all constituents participating in the polymerization.

Macromer

The at least one (meth)acrylate monomer is polymerized in the presence of at least one macromer to form a comb-type graft copolymer (A). Macromers are polymers of relatively low molecular mass, having a reactive, copolymerizable functional group at one or more ends of the polymer. The at least one macromer is selected from the group consisting of polymerizable ethylene-butylene, ethylene-propylene, ethylene-butylene-propylene and isobutylene macromers. The macromer main chains of these ethylene-butylene, ethylene-propylene, ethylene-butylene-propylene and isobutylene macromers are preferably fully hydrogenated. They are obtainable by means of anionic polymerization of the corresponding monomers. One known process, for example, comprises anionic polymerization to prepare hydroxyl-terminated, conjugated diene polymers of monomers such as 1,3-butadiene and/or isoprene. Suitable rubber-like monools such as Kraton® L 1203 are available from Kraton Polymers Company. In a subsequent step, the terminal hydroxyl function can be reacted to form an acryloyl or methacryloyl functionality.

In accordance with the invention, the macromer has a molecular weight of 1000 to 500 000 g/mol, preferably 2000 to about 30 000 g/mol, more preferably 2000 to 10 000 g/mol (measured by means of gel permeation chromatography (GPC), polystyrene as standard, measurement method A1). In one preferred embodiment of the invention, the macromer has a glass transition temperature as measured by the DSC method of −30° C. or less, preferably of −70° C. to −50° C. Such macromers are available commercially, from Kuraray Co., Ltd., for example. One preferred macromer is L-1253 from Kuraray Co., Ltd. Macromers as used herein are polymers of relatively low molecular mass with a functional, copolymerizable reactive group, more particularly an acrylate-functional or methacrylate-functional group, at one or more ends of the polymer.

Comb-Type Graft Copolymer (A)

The comb-type graft copolymer (A) is obtainable by free preferably radical polymerization of the at least one (meth) acrylate monomer or of a monomer mixture comprising the (meth)acrylate monomer in the presence of the at least one macromer. Comb-type graft copolymer (A) is a comblike graft copolymer. The term "graft copolymer" in this context, however, is misleading in that in the present instance the comb-type graft copolymer can be formed by polymerization of comonomers of the comonomer mixture in the presence of the macromer molecules. Instead, therefore, of graft copolymerization, in which an existing polymer backbone serves as a point of attachment for chains of further monomers, the side chains of the comb-type graft copolymer (A) as used herein are preferably introduced during the polymerization of the comonomers with the copolymerizable reactive groups of the macromer, preferably with the acrylate-functional or methacrylate-functional groups of the macromer, via the macromer chains. The copolymerizable reactive groups of the macromer, accordingly, are incorporated into the polyacrylate backbone (main chain) during the actual polymerization of the comonomer mixture. The ethylene-butylene, ethylene-propylene, ethylene-butylene-propylene and/or isobutylene chains of the macromer form the side chains of the comb-type graft copolymer (A) (also referred to herein as hydrocarbon side chains of the comb-type graft copolymer (A)). On the basis of its structure, the comb-type graft copolymer (A) is also referred to as a "bottle brush" polymer. Within the polymer composition of the invention, this structure and the lipophilic nature of the hydrocarbon side chains result in the formation of a continuous acrylate phase and of a discontinuous hydrocarbon phase Kw of the comb-type graft copolymer (A). The hydrocarbon phase Kw is preferably in microphase-separated form. It is thought that the phase-separated, preferably microphase-separated, comb-type graft copolymer (A) unites different physical properties by virtue of the development of the continuous acrylate phase and the discontinuous hydrocarbon phase, these properties being, specifically, a rubber-like—that is, in the present case, a hydrophobic, thermoplastic—character of the side chains, with the inherently pressure-sensitively adhesive properties of the polyacrylate backbone.

The fraction of the at least one macromer is 1 to 50 weight percent, preferably 5 to 25 weight percent and more preferably 10 to 15 weight percent, based on the total weight of all constituents participating in the polymerization. In other words, within the comb-type graft copolymer (A), the macromer units make up 5 to 25 weight percent and preferably 10 to 15 weight percent, based on the total weight of the comb-type graft copolymer (A).

In another preferred embodiment, the polymerization is carried out in the presence of at least one further, non-polyolefinic macromer. This additional non-polyolefinic macromer is preferably selected from the group of the polymethylacrylates, polystyrenes, polydimethylsiloxanes, polyethylene oxides and polypropylene oxides. These further non-polyolefinic macromers are also copolymerizable macromers. In other words, these non-polyolefinic macromers as well preferably have a functional acrylate or methacrylate group at the end of the polymer chain of the macromer. In one embodiment of the invention, the fraction of the at least one further, non-polyolefinic macromer is up to 20, preferably up to 10, more preferably up to 5 weight percent, based on the total weight of all constituents participating in the polymerization.

Hydrocarbon Compound (B)

The multiphase polymer composition comprises at least one hydrocarbon compound (B), preferably at least two hydrocarbon compounds (B-1) and (B-2), which are soluble in the hydrocarbon phase of the comb-type graft copolymer (A). The expression "soluble" in this context is to be understood as meaning that the hydrocarbon compounds (B-1) and (B-2) are compatible with the hydrocarbon side chains of the comb-type graft copolymer (A), and therefore a conjoint hydrocarbon phase Kw1 consisting of the hydrocarbon side chains of the comb-type graft copolymer (A) and of the hydrocarbon compound (B), preferably the hydrocarbon side chains of the comb-type graft copolymer (A) and of the hydrocarbon compounds (B-1) and (B-2), is formed within the polymer composition. The presence of this conjoint hydrocarbon phase is verifiable using a DSC method: if the composition consisting of comb-type graft copolymer (A) and hydrocarbon compound (B) or hydrocarbon compounds (B-1) and (B-2) differs in the DSC measurement merely in the magnitudes of the static glass transition temperatures from said comb-type graft copolymer (A) prior to the addition of compound (B) or compounds (B-1) and (B-2), there is no additional phase in the sense of a phase that could have been detected via an additional static glass transition temperature. On the contrary, the hydrocarbon phase of the polymer composition is characterized via its static glass transition temperature Tg(Kw1). As a result, the hydrocarbon phase Kw1 resulting from the side chains of comb-type graft copolymer (A) and compound (B) has only one glass transition temperature Tg(Kw1), and that differs from the Tg of the pure comb-type graft copolymer (A). If B were insoluble in the hydrocarbon phase Kw of the comb-type graft copolymer, two hydrocarbon phase Tg values—viz., one for the hydrocarbon phase of the (pure) comb-type graft copolymer A and one for component (B)—would be detectable. Accordingly, the acrylate phase within the polymer composition, whereto the acrylate backbone of comb-type graft copolymer (A) makes a contribution, is also quantifiable in terms of its glass transition temperature (Tg(Ac)) by means of DSC.

Hydrocarbon compound (B) preferably comprises a hydrocarbon resin having a number average molecular weight Mn (determined by GPC, method A1) of 1000 g/mol or less, preferably a hard resin (B-1) and/or a soft resin (B-2). Hard resins for the purposes of the present invention are hydrocarbon resins having a softening point of at least 70° C., preferably 70 to 150° C., more preferably 80 to 120° C. Soft resins as used herein are hydrocarbon resins having a softening point of at most 20° C. The respective softening points of hydrocarbon resins (B-1) and (B-2) are ring & ball softening points (as measured to ASTM E28-99).

Hydrocarbon compound (B) is preferably a mixture of two hydrocarbon resins (B-1) and (B-2). Hydrocarbon resins (B-1) and (B-2) are preferably in a (B-1):(B-2) weight ratio of 41:59 to 70:30. In a particularly preferred embodiment of the invention, the proportion of hydrocarbon resin (B-1) having a softening point of at least 70° C. is between 41 and 70 weight percent, more preferably between 50 and 60 weight percent, based on the total amount of all hydrocarbon resins in the multiphase polymer composition.

Suitable hard resins are petroleum-based synthetic hydrocarbons. Examples include resins based on aliphatic olefins. Such resins are available from Cray Valley under the Wingtack® 95 name, from Exxon under the Escorez® trade name, from Arakawa Chemical under the Arkon® (P series) trade name, from Hercules Speciality Chemicals under the Regalrez® (1030, 2000 and 5000 series) trade name and under the Regalite® (R series) name, and from Yasuhara Yushi Kogyo Company under the Clearon® trade name.

Suitable soft resins are the C5 resin Wingtack® 10 from Cray Valley, the polyterpene resin Dercolyte® LTG and the fully hydrogenated hydrocarbon resins Regalite® 1010 and Piccotac® 1020.

In a further embodiment of the invention, the proportion of the polymer composition hydrocarbon phase Kw1, the Tg of which, Tg(Kw1), is DSC determinable, which is attributable to the at least one hydrocarbon compound (B), preferably compounds (B-1) plus (B-2), soluble in the hydrocarbon phase Kw of comb-type graft copolymer (A) is at least 80 weight percent based on the weight fraction of the polymer composition which is attributable to the hydrocarbon phase, i.e., based on the amount of hydrocarbon side chains of comb-type graft copolymer (A) and of the hydrocarbon resin(s) (B)/(B-1) and (B-2).

Surprisingly, the hydrocarbon resins (B-1) and (B-2) turned out to be suitable for providing particularly advantageous polymer compositions when said hydrocarbon compounds (B-1) and (B-2) are present in a proportion of 36 to 70 parts by weight, preferably 40 to 55 parts by weight, based on 100 parts by weight of the polymer composition. When high proportions of the polymer composition are attributable to hydrocarbon compound (B-2), an additional hydrocarbon phase may be formed within the acrylate phase. One possible explanation for this is that the soft resin (B-2) is admixed in an amount exceeding the solubility limit of hydrocarbon compound (B-2) within the hydrocarbon phase of comb-type graft copolymer (A). This additional hydrocarbon phase is detectable, for example by dynamic mechanical analysis (DMA) (measurement method A3).

Additives and Tackifier Resins

Aside from comb-type graft copolymer (A) and hydrocarbon compounds (B-1) and (B-2), the polymer composition may comprise at least one additive and/or tackifier resin. Additives as used herein comprise plasticizers, oils, and resins which are soluble in the acrylate phase of the comb-type graft copolymer (A), preferably rosin esters and/or terpene-phenolic resins. Preferred rosin esters are hydrogenated rosin esters. Preferred terpene-phenolic resins are ageing-resistant terpene-phenolic resins.

It is likewise possible to mix one or more tackifier resins. The static glass transition temperatures of the acrylate phase, $Tg(Ac)$, and of the hydrocarbon phase, $Tg(Kw1)$, of the polymer composition are fine-tunable by employing suitable tackifier resins. If present, additives and tackifier resins are preferably in an amount of up to 20 parts by weight, preferably up to 5 parts by weight, based on 100 parts by weight of the polymer composition.

In a further preferred embodiment, the polymer composition comprises an additional hydrocarbon compound (C) whose number average molecular weight (Mn) is more than 1000 g/mol. This additional hydrocarbon compound (C) is preferably a further soft resin. In particular, the polymer composition comprises at least one hydrocarbon compound (B), more preferably a hydrocarbon compound (B-1) and a hydrocarbon compound (B-2) having a number average molecular weight (Mn) (as determined by GPC, method A1) of 1000 g/mol or less and an additional hydrocarbon compound (C) whose number average molecular weight (Mn) is more than 1000 g/mol. In one particular embodiment of the invention, the hydrocarbon compound (C) forms a discontinuous phase within the acrylate phase of the polymer composition. In other words, this particular embodiment comprises two different discontinuous phases within the continuous phase of the polymer composition. In this embodiment, the static glass transition temperature of this additional phase within the polymer composition, $Tg(C)$, is intermediate the glass transition temperatures $Tg(Kw1)$ and $Tg(Ac)$ of the polymer composition.

It is further possible to use aging inhibitors, light stabilizers and ozone protectants as additives. Aging inhibitors used may be Irganox® products from BASF or Hostanox® from Clariant, preferably primary inhibitors, examples being 4-methoxyphenol or Irganox® 1076, and secondary aging inhibitors, examples being Irgafos® TNPP or Irgafos® 168 from BASF, including in combination with one another. Other suitable aging inhibitors are phenothiazine (C radical scavenger) and also hydroquinone methyl ether in the presence of oxygen, and oxygen itself. Light stabilizers used may be UV absorbers (Cyasorb® series) or sterically hindered amines (Tinuvin® series).

In one preferred embodiment of the invention, the comb-type graft copolymer (A) or the multiphase polymer composition is crosslinked. Contemplated as possible crosslinkers, with which, for example, hydroxy-, acid anhydride- or caprolactam-functional groups within the acrylate phase of the comb-type graft copolymer may be used for boosting the cohesion of the polymer composition, include, in particular, chemical crosslinking agents which bond coordinatively or covalently. Exemplary coordinative crosslinkers are metal chelates such as aluminum chelate and titanium chelate, for example. Exemplary covalent crosslinkers, which can be used in particular to boost the high-temperature shear strength, are isocyanates, epoxides, aziridines, carbodiimides and oxazolines. For the purposes of the present invention, crosslinkers are used preferably in an amount of about 0.02 to about 2 weight percent, based on the total weight of the comb-type graft copolymer (A).

Preparation of Multiphase Polymer Compositions

The polymer compositions of the present invention are obtainable by first polymerizing the at least one (meth)acrylate monomer described herein, or a monomer mixture comprising the at least one (meth)acrylate monomer, in the presence of the at least one macromer, selected from the group consisting of polymerizable ethylene-butylene, ethylene-propylene, ethylene-butylene-propylene and isobutylene macromers, to form the comb-type graft copolymer (A). The comb-type graft copolymer (A) here may be prepared by conventional polymerization techniques familiar to the skilled person. These processes include solution, suspension, emulsion and bulk polymerization processes. The comb-type graft copolymers (A) are preferably prepared in solution by free radical polymerization. Preferred solvents and solvent mixtures ensure sufficient solubility of the macromers and are ethyl acetate, acetone, methyl isopropyl ketone, hexane and/or heptane, and also toluene, and mixtures of the stated solvents. In one preferred embodiment of the invention, the residual monomer content is reduced after the polymerization, using known methods from the prior art.

Following removal of the solvent (where present), the acrylate backbone and the hydrocarbon side chains of the comb-type graft copolymer are present in the form of a phase-separated structure, preferably a microphase-separated structure, in which the hydrocarbon phase ($Kw1$), which is formed from the hydrocarbon side chains of the comb-type graft copolymer (A) and of the at least one hydrocarbon compound (B) soluble in this hydrocarbon phase, is present discontinuously in the continuous acrylate phase of the polymer composition. Continuously in this context means that the acrylate phase envelops the individual sections of the discontinuous hydrocarbon phase (also called domains) like a matrix. The presence of a microphase-separated structure is manifested in the form of a transparent appearance to the polymer composition. In such a polymer composition, the domains of the hydrocarbon phase have a size which is below the wavelength of visible light (390-780 nm).

Pressure-Sensitive Adhesive

The present invention further provides pressure-sensitive adhesives comprising the polymer composition of the present invention. Surprisingly, the pressure-sensitive adhesives were found to be particularly suitable for bonding substrates having apolar surfaces. Yet the pressure-sensitive adhesives of the present invention are still suitable for bonding polar surfaces. Apolar surfaces are substrates having a low surface energy or low surface tension, in particular a surface tension of less than 45 mN/m, preferably less than 40 mN/m and more preferably less than 35 mN/m. Surface tension is determined by measuring the contact angle to DIN EN 828.

The pressure-sensitive adhesive of the present invention is preferably provided in film form, i.e., as an adhesive tape.

For this purpose, the multiphase polymer composition, either as such or after addition of tackifier resins, may be formed via commonly used coating methods from a solution into a layer of pressure-sensitive adhesive on a carrier material (film, foam, syntactic foam, fabric, paper), the layer of pressure-sensitive adhesive having a weight per unit area of 40 to 100 g/m2.

Adhesive tapes of the invention may take any of the following forms:

single-layer, double-sidedly self-adhesive tapes—known as "transfer tapes"—comprising a single layer of the pressure-sensitive adhesive of the invention or the multiphase polymer composition of the invention;

single-sidedly self-adhesively furnished adhesive tapes—"single-sided self-adhesive tapes" hereinafter—where the pressure-sensitive adhesive of the invention or the multiphase polymer composition of the invention is provided in a multilayer product, examples being two-layer systems comprising a layer of the pressure-sensitive adhesive of the invention or of the multiphase polymer composition of the invention and a foamed or unfoamed carrier layer, multilayer, double-sidedly self-adhesively furnished adhesive tapes having two pressure-sensitive adhesive layers—"double-sided self-adhesive tapes" below—of which at least one comprises the multiphase polymer composition of the invention, double-sided adhesive tapes having a heat-activatable adhesive layer on one of the adhesive-tape sides and a layer of the pressure-sensitive adhesive of the invention or the multiphase polymer composition of the invention on the other adhesive-tape side. To this end, the two layers can be applied to different sides of at least one foamed or unfoamed carrier or to different sides of a multilayered system.

The double-sided products here, irrespective of whether they are intended for adhesive bonding or for sealing, may have a symmetrical or asymmetrical construction.

The adhesive tape is preferably provided, on one side at least, a liner, i.e., for example a silicone-coated film or a silicone paper, for transportation, storage or die-cutting processes.

The invention will now be more particularly described by means of specific examples.

Experimental Section

The exemplary experiments which follow are intended to more particularly describe the invention without the invention being unnecessarily restricted by the choice of the examples disclosed.

Measurement Methods (General):

Gel Permeation Chromatography GPC (Method A1):

The figures in this specification for the number-average and weight-average molecular weights $M_n$ and $M_w$, and the polydispersity PD relate to the determination by gel permeation chromatography. The determination takes place on 100 µL samples subjected to clarifying filtration (sample concentration 4 g/L). The eluent used is tetrahydrofuran with 0.1 vol % of trifluoroacetic acid. Measurement takes place at 25° C. The preliminary column used is a PSS-SDV column, 5 µ, $10^3$ Å, ID 8.0 mm×50 mm. Separation takes place using the columns PSS-SDV, 5 µ, $10^3$ Å and also $10^5$ Å and $10^6$ Å, each of ID 8.0 mm×300 mm (columns from Polymer Standards Service; detection using Shodex R171 differential refractometer). The flow rate is 1.0 mL per minute. Calibration takes place against PMMA standards (polymethyl methacrylate calibration) in the case of the comb-type graft copolymers and PS standards (polystyrene calibration) in the case of the hydrocarbon resins.

Static Glass Transition Temperature Tg (Measurement Method A2):

The static glass transition temperature is determined by dynamic scanning calorimetry in accordance with DIN 53765. The figures given for the glass transition temperature Tg relate to the glass transformation temperature value Tg according to DIN 53765:1994-03, unless indicated otherwise specifically.

Dynamic Mechanical Analysis (DMA) (Measurement Method A3):

The test is run in a shear rate controlled rheometer from Ares under torsional load using a plate-plate geometry with a plate diameter of 25 mm. The temperature sweep measurement is carried out using a measurement frequency of 10 rad/s, a temperature range of −40° C. to 130° C., a heating rate of 2.5° C./min and a deformation of 1%.

Solids Content (Measurement Method A4):

The solids content is a measure of the fraction of unevaporable constituents in a polymer solution. It is determined gravimetrically, with the solution being weighed, then the vaporizable fractions being evaporated off in a drying cabinet at 120° C. for 2 hours, and the residue weighed again.

Measurement Methods (for Pressure-Sensitive Adhesives in particular):

180° Bond Strength Test (Measurement Method H1):

The bond strength to steel is determined in a test atmosphere of 23° C. +/− 1° C. temperature and 50% +/− 5% rel. humidity. A strip 20 mm wide of an acrylate-type pressure-sensitive adhesive applied to polyester in the form of a layer was applied to steel plates washed beforehand with acetone twice and with isopropanol once and then let lie exposed to the air for 5 minutes in order that the solvent may flash off. The pressure-sensitively adhesive strip was pressed twice onto the substrate with an applied pressure corresponding to a weight of 2 kg. The adhesive tape was then immediately peeled off the substrate at a speed of 300 mm/min and at an angle of 180°. The measurements were all conducted at room temperature. The measured results are reported in N/cm as averages of three measurements. The bond strength to polyethylene (PE) and varnish was determined in a similar manner. The varnish used in each case was Uregloss® Colorless varnish (product No. FF79-0060 0900) from BASF.

Holding Power (Measurement Method H2):

A strip of the adhesive tape 13 mm wide and more than 20 mm (30 mm for example) in length was applied to a smooth steel surface cleaned three times with acetone and once with isopropanol. The bonding area is 20 mm×13 mm (length×width), and the adhesive tape overhangs the test plate at the edge (for example by 10 mm in accordance with the above-specified length of 30 mm). The adhesive tape was then pressed down four times on the steel support with an applied pressure corresponding to a weight of 2 kg. This sample was suspended vertically so that the overhanging edge of the adhesive tape points downwardly.

At room temperature, a weight of 1 kg was fastened to the overhanging edge of the adhesive tape. The measurement is carried out under standard conditions (23° C.+/− 1° C., 55%+/−5% humidity) and at 70° C. in a thermal cabinet while the sample was subjected to the load of 0.5 kg weight.

The measured holding times (times of the adhesive tape to completely debond from the substrate; measurement discontinued at 10 000 min) are reported in minutes and correspond to the mean value of three measurements.

Commercially Available Chemicals Used

| Chemical compound | Trade name | Manufacturer | CAS No. |
|---|---|---|---|
| 1,3-butadiene, homopolymer, hydrogenated, hydroxyl terminated, monomethacrylate | L-1253 | Kuraray | 260057-97-4 |
| isostearyl acrylate | ISTA | ISA Co., Ltd. | 93841-48-6 |
| 2,2'-azobis(2-methylbutylnitrile) | Vazo® 67 | DuPont | 13472-08-7 |
| bis(4-tert-butylcyclohexyl) peroxydicarbonate | Perkadox® 16 | Akzo Nobel | 15520-11-3 |
| hydrocarbon resin ($C_5$ based, low aromatics content, softening point (ring & ball) 94° C.) | Piccotac® 1095-N | Eastman | — |
| liquid hydrocarbon resin ($C_5$ based) | Wingtack® 10 | Cray Valley | 26813-14-9 |
| hydrogenated liquid polyisoprene | LIR-290 | Kuraray | 151789-04-7 |
| terpene-phenolic resin (softening point 110° C.; $M_w$ = 500-800 g/mol; D = 1.50) | Dertophene® T110 | DRT resins | 25359-84-6 |
| Aluminum acetylacetonate | — | Sigma-Aldrich | 13963-57-0 |

I PREPARATION OF COMB-TYPE GRAFT COPOLYMERS (A)-P1 to P4

The preparation of exemplary comb-type graft copolymers (A) will now be more particularly described.

Example P1

A 100 L glass reactor conventional for radical polymerizations was charged with 1.2 kg of acrylic acid (AA, 3%), 20.97 kg of 2-ethylhexyl acrylate (EHA, 52.43%), 9.83 kg of butyl acrylate (BA, 24.57%), 4.0 kg of isobornyl acrylate (IBOA, 10%), 4.0 kg of macromer L-1253 (10%) and 20.8 kg of acetone/60/95 spirit (1:1). After nitrogen gas had been passed through the reactor for 45 minutes, with stirring, the reactor was heated up to 58° C. and 0.8 kg of Vazo® 67 was added. Thereafter the external heating bath was heated to 75° C. and the reaction was carried out constantly at this external temperature. After a reaction time of 1 hour, a further 0.8 kg of Vazo® 67 was added. Over a period of 5 hours (counted from the last addition of Vazo® 67), dilution took place at hourly intervals with 5.0 to 10.0 kg, depending on the rise in viscosity, of 60/95 spirit, and so adequate mixing was ensured. In order to reduce the level of residual monomers, additions of 1.5 kg each time of bis(4-tert-butylcyclohexyl) peroxydicarbonate were made after 6 hours and after 7 hours from the start of reaction, with dilution in between with 15 kg of 60/95 spirit. After a reaction time of 24 hours, the reaction was discontinued by cooling to room temperature.

Comb-Type Graft Copolymers (A)-P2 to P4

Hybrid polymers P2 to P4 were prepared similarly to Example P1. Mass percentages of the monomers used in each case are itemized in table 1.

TABLE 1

Comb-type graft copolymers P2 to P4

| | 2 | 3 | 4 |
|---|---|---|---|
| AA | 3.0% | 5.0% | 5.0% |
| BA | 26.9% | 25.5% | 25.5% |
| EHA | 60.1% | 54.5% | 54.5% |
| IBOA | — | — | — |
| ISTA | — | — | 5.0% |
| L-1253 | 10.0% | 15.0% | 10.0% |

Table 2 shows the molar mass distributions as measured by GPC and the static glass transition temperatures of comb-type graft copolymers P1 to P4 as measured by DSC.

TABLE 2

Polymer data of polymers P1 to P4

| | $M_n$ [g/mol][a] | $M_w$ [g/mol][a] | PD [—][a] | stat. $Tg_1$ [° C.][b] | stat. $Tg_2$ [° C.][b] |
|---|---|---|---|---|---|
| P 1 | 64 800 | 1 570 000 | 24.23 | −67.7 | −39.6 |
| P 2 | 64 900 | 1 550 000 | 23.88 | −67.7 | −50.5 |
| P 3 | 68 700 | 1 670 000 | 28.44 | −67.7 | −49.4 |
| P 4 | 58 100 | 1 620 000 | 27.88 | −53.4 | −49.9 |

[a] as measured by measurement method A1.
[b] as measured by measurement method A2;
Tg1 is the hydrocarbon phase static glass transition temperature developed by the comb-type graft copolymer;
Tg2 is the acrylate phase static glass transition temperature developed by the comb-type graft copolymer.

II PREPARATION OF MULTIPHASE POLYMER COMPOSITIONS PSA1 to PSA9 and of COMPARATIVE EXAMPLES V10 and V11

Multiphase polymer compositions PSA1 to PSA9 and also Comparative Examples V10 and V11 were prepared from comb-type graft copolymers P1 to P4. To this end, each of the comb-type graft copolymers obtained above was diluted with spirit to a solids content of 30%. Then, 0.3 wt % of aluminum acetylacetonate crosslinker and the resin(s) of table 3 were added to the solution, followed by coating onto a 36 μm thick PET film (Kemafoil HPH 100, from Covema) and subsequent drying (coating speed 2.5 m/min, drying tunnel 15 m, temperatures in zone 1: 40° C., zone 2: 70° C., zone 3: 95° C., zone 4: 105° C.). Mass add-on was 50 g/m² in each case.

Resin fractions and static glass transition temperatures of acrylate and hydrocarbon phases of multiphase polymer compositions are itemized in table 3 and adhesion performance data of Examples PSA1 to PSA9 and of the comparative examples are itemized in table 4.

TABLE 4

Adhesion performance data of multiphase polymer compositions PSA1 to PSA9 and of Comparative Examples V10 and V11

| Ex. | BS instant, steel [N/cm] | BS instant, FF-79 [N/cm] | BS instant, PE [N/cm] | HP RT [min] |
|---|---|---|---|---|
| PSA 1 | 9.54 | 6.7 | 5.14 | 10 000 |
| PSA 2 | 9.65 | 6.2 | 6.12 | 10 000 |
| PSA 3 | 10.83 | 9.36 | 6.98 | 10 000 |
| PSA 4 | 12.79 | 10.52 | 5.89 | 10 000 |
| PSA 5 | 15.74 | 15.39 | 7.56 | 7200 (K) |
| PSA 6 | 15.44 | 14.89 | 8.21 | 9805 (K) |
| PSA 7 | 14.53 | 12.21 | 7.22 | 10 000 |

TABLE 4-continued

Adhesion performance data of multiphase polymer compositions
PSA1 to PSA9 and of Comparative Examples V10 and V11

| Ex. | BS instant, steel [N/cm] | BS instant, FF-79 [N/cm] | BS instant, PE [N/cm] | HP RT [min] |
|---|---|---|---|---|
| PSA 8 | 15.36 | 14.99 | 7.87 | 7108 (K) |
| PSA 9 | 15.95 | 15.64 | 8.01 | 10 000 |
| V10 | 5.23 | 2.6 | 1.31 | 8.453 (A) |
| V11 | 8.63 | 6.7 | 4.42 | 3.682 (A) |

Bond strength (BS) instant was measured as per measurement method H1; holding power (HP) at room temperature was measured as per measurement method H2.
(A): adhesive failure,
(K): cohesive failure.

TABLE 3

Multiphase polymer compositions PSA1 to PSA9, Comparative Examples V10 and V11

| | Polymer | Piccotac 1095-N [%] | Wingtack 10 [%] | LIR-290 [%] | Dertophene T110 [%] | total resin in composition [%] | resin fraction based on hydrocarbon phase | HC hard resin in total resin [%] | Tg (Kw) [° C.][b)] | Tg (Ac) [° C.][b)] | □ Tg [K] |
|---|---|---|---|---|---|---|---|---|---|---|---|
| PSA1 | P1 | 20.3 | 26.0 | — | — | 46.3 | 88.4 | 43.8 | 8.1 | −39.6 | 42.5 |
| PSA2 | P1 | 30.0 | 16.0 | 10.0 | — | 56.0 | 92.7 | 65.2 | 1 | −39.6 | 40.6 |
| PSA3 | P2 | 26.2 | 23.8 | — | — | 50.0 | 90.0 | 52.3 | 4.3 | −50.5 | 54.8 |
| PSA4 | P2 | 27.9 | 23.2 | — | — | 51.1 | 91.4 | 54.6 | 6.3 | −50.5 | 56.8 |
| PSA5 | P3 | 30.3 | 23.0 | — | — | 53.3 | 86.9 | 56.8 | 6.4 | −49.4 | 55.8 |
| PSA6 | P3 | 27.8 | 20.5 | 5.0 | — | 53.3 | 86.9 | 57.6 | 0.5 | −49.4 | 49.9 |
| PSA7 | P3 | 31.2 | 24.0 | — | — | 55.2 | 87.8 | 56.6 | 7.4 | −49.4 | 56.8 |
| PSA8 | P4 | 30.3 | 23.0 | — | — | 53.3 | 86.9 | 56.8 | 6.4 | −49.9 | 56.3 |
| PSA9 | P4 | 30.3 | 23.0 | — | 10.0 | 53.3 | 86.9 | 47.9 | 6.4 | −34.1 | 40.5 |
| V10 | P1 | 45.8 | — | — | — | 45.8 | 88.2 | 100 | 44.1 | −39.9 | 84 |
| V11 | P1 | 16.3 | 30.0 | — | — | 46.3 | 88.4 | 35.2 | −6.0 | −39.9 | 33.9 |

[b)]measured by measurement method A2.

Comparative Examples V10 and V11 illustrate the combination of comb-type graft copolymers (A) with an unfavorable static glass transition temperature for the hydrocarbon phase of the composition and also with an unfavorable glass transition temperature difference between the acrylate and hydrocarbon phases.

III PEEL INCREASE BEHAVIOR OF MULTIPHASE POLYMER COMPOSITIONS PSA1 to PSA9 and OF COMPARATIVE EXAMPLES V10 and V11

Table 5 itemizes peel increase behavior for the compositions according to the present invention and for the comparative examples.

TABLE 5

Peel increase behavior

| Ex. | BS instant, steel [N/cm] | BS 3 min, steel [N/cm] | BS 1 d, steel [N/cm] | BS 3 d, steel [N/cm] |
|---|---|---|---|---|
| PSA 1 | 9.54 | 9.60 | 9.62 | 9.61 |
| PSA 2 | 9.65 | 9.58 | 9.62 | 9.64 |
| PSA 3 | 10.83 | 10.88 | 10.92 | 10.92 |
| PSA 4 | 12.79 | 12.80 | 12.75 | 12.77 |
| PSA 5 | 15.74 | 15.62 | 15.74 | 15.72 |
| PSA 6 | 15.44 | 15.62 | 15.65 | 15.67 |
| PSA 7 | 14.53 | 14.21 | 14.22 | 14.36 |
| PSA 8 | 15.36 | 15.99 | 15.87 | 15.92 |
| PSA 9 | 15.95 | 15.96 | 15.97 | 15.81 |
| V10 | 5.23 | 5.87 | 6.31 | 6.78 |
| V11 | 8.63 | 8.7 | 8.95 | 9.78 |

What the results reveal is that the compositions which are not in accordance with the present invention take time to adequately wet the surface, as a result of which bond strength takes time to develop, whereas the inventive examples tend to show more of a rubber-type behavior and instantly wet the surface effectively.

What is claimed is:
1. A multiphase polymer composition comprising
   a comb-type graft copolymer (A) which is obtained by polymerizing at least one (meth)acrylate monomer selected from the group consisting of butyl acrylate, amyl acrylate, 2-ethylhexyl acrylate, isooctyl acrylate and decyl acrylate in the presence of at least one macromer selected from the group consisting of polymerizable ethylene-butylene, ethylene-propylene, ethylene-butylene-propylene and isobutylene macromers, and which forms a continuous acrylate phase and a discontinuous hydrocarbon phase Kw,
   and at least one hydrocarbon compound (B) soluble in said hydrocarbon phase Kw of said comb-type graft copolymer (A), said hydrocarbon compound (B) being a mixture of hydrocarbon resins (B-1) and (B-2) and is present in a proportion of 36 to 70 parts by weight, based on 100 parts by weight of the polymer composition, resin (B-1) having a softening point of at least 70° C. and resin (B-2) having a softening point of at most 20° C.
   wherein said at least one (meth)acrylate monomer is present in a fraction of 43-97 weight per cent, based on all constituents participating in the polymerization, and
   wherein the multiphase polymer composition comprises a continuous acrylate phase having a static glass transition temperature Tg(Ac), as measured by the DSC method, and a discontinuous hydrocarbon phase Kw1 having a static glass transition temperature Tg(Kw1), as measured by the DSC method, and wherein the said static glass transition temperatures Tg(Kw1) and Tg(Ac) of the polymer composition differ by 45 to 60 kelvins.

2. The polymer composition as claimed in claim 1, wherein the static glass transition temperature of the discontinuous hydrocarbon phase within the polymer composition, Tg(Kw1), is in a range from −5 to +15° C.

3. The polymer composition as claimed in claim 1, wherein the static glass transition temperature of the continuous acrylate phase within the polymer composition, Tg(Ac), is below −10° C.

4. The polymer composition as claimed in claim 1, wherein the macromer has a number average molecular weight Mn, as measured by the GPC method, of 1000 to 500 000 g/mol.

5. The polymer composition as claimed in claim 1, wherein said comb-type graft copolymer (A) comprises 30-64 weight percent, based on the combined weight of comb-type graft copolymer (A) and the at least one hydrocarbon compound (B).

6. The polymer composition as claimed in claim 1, wherein the macromere units within said comb-type graft copolymer (A) comprise 5-25 weight percent, based on the total weight of comb-type graft copolymer (A).

7. The polymer composition as claimed in claim 1, wherein the polymerization of the at least one (meth)acrylate monomer is carried out in the presence of at least one further copolymerizable monomer, wherein this at least one further copolymerizable monomer is selected from the group consisting of itaconic acid, itaconic anhydride, maleic acid, maleic anhydride, vinyl acetate, vinyl butyrate, vinyl propionate, vinyl isobutyrate, vinyl valerate, vinyl versatate, N-vinylpyrrolidone and N-vinylcaprolactam.

8. The polymer composition as claimed in claim 1, wherein said comb-type graft copolymer (A) is obtained by polymerizing a comonomer mixture comprising acrylic acid, butyl acrylate and 2-ethylhexyl acrylate in the presence of the at least one macromer.

9. The polymer composition as claimed in claim 1, wherein the polymerization of the at least one (meth)acrylate monomer is carried out in the presence of at least one further non-polyolefinic macromer.

10. The polymer composition as claimed in claim 1, wherein said hydrocarbon compound (B) is a hydrocarbon resin having a number average molecular weight Mn of 1000 g/mol or less, as measured by the GPC method.

11. The polymer composition as claimed in claim 1, wherein the polymer composition further comprises a further hydrocarbon compound (C) whose number average molecular weight Mn, as measured by the GPC method, is more than 1000 g/mol, and wherein the polymer composition has a static glass transition temperature Tg(C) intermediate the glass transition temperatures of the continuous acrylate phase, Tg(Ac), and of the discontinuous hydrocarbon phase, Tg(Kw).

12. The polymer composition as claimed in claim 1, wherein the polymer composition further comprises at least one additive selected from the group consisting of plasticizers, of oils and of resins soluble in the acrylate phase of the comb-type graft copolymer.

13. The polymer composition as claimed in claim 1, wherein the amount of said hydrocarbon compound (B) and, if present, of said hydrocarbon compound (C) comprises 80 weight percent or more, based on the total proportion of the discontinuous hydrocarbon phase within the polymer composition.

14. A method of preparing the multiphase polymer composition of claim 1, comprising the steps of
polymerizing at least one (meth)acrylate monomer selected from the group consisting of butyl acrylate, amyl acrylate, 2-ethylhexyl acrylate, isooctyl acrylate and decyl acrylate in the presence of at least one macromer selected from the group consisting of polymerizable ethylene-butylene, ethylene-propylene, ethylene-butylene-propylene and isobutylene macromers to form a comb-type graft copolymer (A) having an acrylate main chain and hydrocarbon side chains;
mixing said comb-type graft copolymer (A) thus obtained with at least one hydrocarbon compound (B) which is compatible with the hydrocarbon side chains of said comb-type graft copolymer (A).

15. A pressure-sensitive adhesive comprising a multiphase polymer composition of claim 1.

16. A method of bonding articles, wherein said articles are bonded with a pressure-sensitive adhesive of claim 1.

* * * * *